United States Patent [19]

van den Nieuwelaar et al.

[11] Patent Number: 5,104,351
[45] Date of Patent: Apr. 14, 1992

[54] DEVICE FOR BONING A PIECE OF MEAT

[75] Inventors: Adrianus J. van den Nieuwelaar; Henricus F. J. M. van de Eerden, both of Gemert, Netherlands

[73] Assignee: Stork PMT B.V., Boxmeer, Netherlands

[21] Appl. No.: 591,836

[22] Filed: Oct. 2, 1990

[30] Foreign Application Priority Data

Oct. 6, 1989 [NL] Netherlands ............... 8902493

[51] Int. Cl.⁵ .................. A22C 25/16; A22C 21/00
[52] U.S. Cl. ................................ 452/135; 452/138
[58] Field of Search ................ 452/135, 136, 138

[56] References Cited

U.S. PATENT DOCUMENTS

| | | | |
|---|---|---|---|
| 3,570,050 | 3/1971 | Draper et al. | 17/16 |
| 3,930,282 | 1/1976 | Martin et al. | 17/11 |
| 4,025,001 | 5/1977 | Yarem et al. | 452/138 |
| 4,077,089 | 3/1978 | Dutaud | 452/138 |
| 4,385,421 | 5/1983 | Martin | 17/52 |
| 4,402,112 | 9/1983 | Gasbarro | 17/11 |
| 4,557,017 | 12/1985 | Gasbarro | 17/11 |
| 4,610,051 | 9/1986 | Martin et al. | 17/11 |
| 4,639,972 | 2/1987 | Martin et al. | 17/11 |
| 4,644,608 | 2/1987 | Martin et al. | 17/46 |

FOREIGN PATENT DOCUMENTS

| | | |
|---|---|---|
| 2244404 | 4/1975 | France . |
| 8502784 | 5/1986 | Netherlands . |
| 8502785 | 5/1986 | Netherlands . |
| 2120925 | 12/1983 | United Kingdom . |

Primary Examiner—Willis Little
Attorney, Agent, or Firm—Hurt, Richardson, Garner, Todd & Cadenhead

[57] ABSTRACT

A device for removing an elongated bone from a piece of meat comprising means for conveying the piece of meat in succession through; one or more processing stations where the meat is scraped away from the bone, at right angles to the lengthwise direction of the bone, until a certain part of the bone surface is exposed, apart from a narrow connection between the meat and the bone, while the meat removed is guided away from the bone; a processing station where the above-mentioned narrow connection is broken. In a first processing station a separation may be made along the length of the bone through the meat up to the bone. Preferably a second and a third processing station each comprise two first helical rollers provided with ribs with opposite pitch and rotating in opposite directions to each other, the helical rollers being disposed parallel to and on either side of the path of the bone.

12 Claims, 6 Drawing Sheets

DEVICE FOR BONING A PIECE OF MEAT

BACKGROUND OF THE INVENTION

This invention relates to a device for removing an elongated bone from a piece of meat, in particular removing the thigh bone from a piece of poultry thigh meat.

DISCUSSION OF THE PRIOR ART

During the slaughter of animals often pieces of meat containing a bone not wanted by a consumer are obtained, and the bone must therefore be removed.

Apart from the possibility of removing the bone by hand using a knife or scraper or the like, various devices for mechanized removal of a bone from a piece of meat are known, which devices can be used for processing large numbers of pieces of meat which must be the same shape.

Such a known device, for example, presses a piece of meat between two surfaces provided with a recess for the bone. The meat is in this way pressed away from the bone to a place lying outside the press surfaces, while the bone is left behind in the space formed by the recesses.

In another known device, the meat is stripped from a bone by gripping one end of the bone and then pulling the bone in the lengthwise direction thereof through an opening in a wall, which opening has slightly larger dimensions than the largest transverse dimension of the bone.

U.S. Pat. No. 4,644,608 discloses a device in which the meat by means of a conveyor is guided through a peeling-off device comprising two plates separated by a narrow slot and fixed at an angle to the direction of conveyance, the slot having a broader portion near the conveyor.

The broadened portion of the slot provides a passage for the bone while the meat is fed to the peeling-off device, while the meat cannot pass the plates and is peeled off the bone thereby.

The known devices have a number of disadvantages.

During pressing out of the bone, pulling out of the bone or peeling off the meat from the bone, the meat is exposed at least locally to great forces, as a result of which at the places in question the meat can lose its fibrous structure and/or can be damaged, which results in a great loss of value of the meat.

Besides, the devices described will not produce the desired result, namely separating meat and bone as fully as possible, if:

The shape and dimensions of the bone deviate from the expected configuration; while the bone is being pressed out it can end up between the press surfaces and become splintered, causing a large part of the meat to become unusable; while the bone is being pulled out there is a great risk that the end of the bone will not be gripped, and mechanical removal of the bone fails;

The bone is jointed badly, in other words, apart from the bone, parts of adjacent bones are present in the piece of meat, or a part of the bone is missing; in this case the above-mentioned disadvantages result again during the pressing out or pulling out of the bone, the cause of such disadvantages being the unforeseeable shape of the bone to be removed;

the bone is of poor quality, in other words, it is brittle and can easily break during pulling out of the bone in particular, the prevailing forces may cause a fracture in the bone to be removed, so that only a part of the bone is pulled out of the meat;

the bone is broken; the disadvantages thereof have already been discussed above; or any combination of the above-mentioned cases occurs.

SUMMARY OF THE INVENTION

The object of the invention is to eliminate the above-mentioned disadvantages. This object is attained according to the invention by a device comprising means for conveying the piece of meat in succession through:

one or more processing stations where the meat is scraped away from the bone, at right angles to the lengthwise direction of the bone, until a certain part of the bone surface is exposed, apart from a narrow connection between the meat and the bone, while the meat removed is guided away from the bone;

a processing station where the above-mentioned narrow connection is broken.

The point of departure in operating the device according to the invention for removing a bone from a piece of meat is the presence or providing of a separation in the lengthwise direction of the bone, reaching up to the bone. This separation can be present naturally between muscle tissue running in the lengthwise direction of the bone or, if this is not the case, can be provided intentionally. In the latter case preference is given to providing the separation at the side of the piece of meat where there is as little meat as possible on the bone. In this way, the separation can be carried out most easily and will damage the meat as little as possible.

The meat is exposed to very small forces in the device, so that its fibre structure is retained as much as possible, and the risk of damage is very low.

The device according to the invention is also suitable or processing pieces of meat of a great variety of elongated shapes and dimensions, while as regards complete and sole removal of the bone it is unimportant whether the bone is badly jointed or the bone is of poor quality, or the bone is broken.

The claims and advantages will be more readily appreciated as the same becomes better understood by reference to the following detailed description considered in connection with the accompanying drawings in which like reference symbols designate like parts in the figures.

DESCRIPTION OF THE PREFERRED EMBODIMENT

Figure 1:
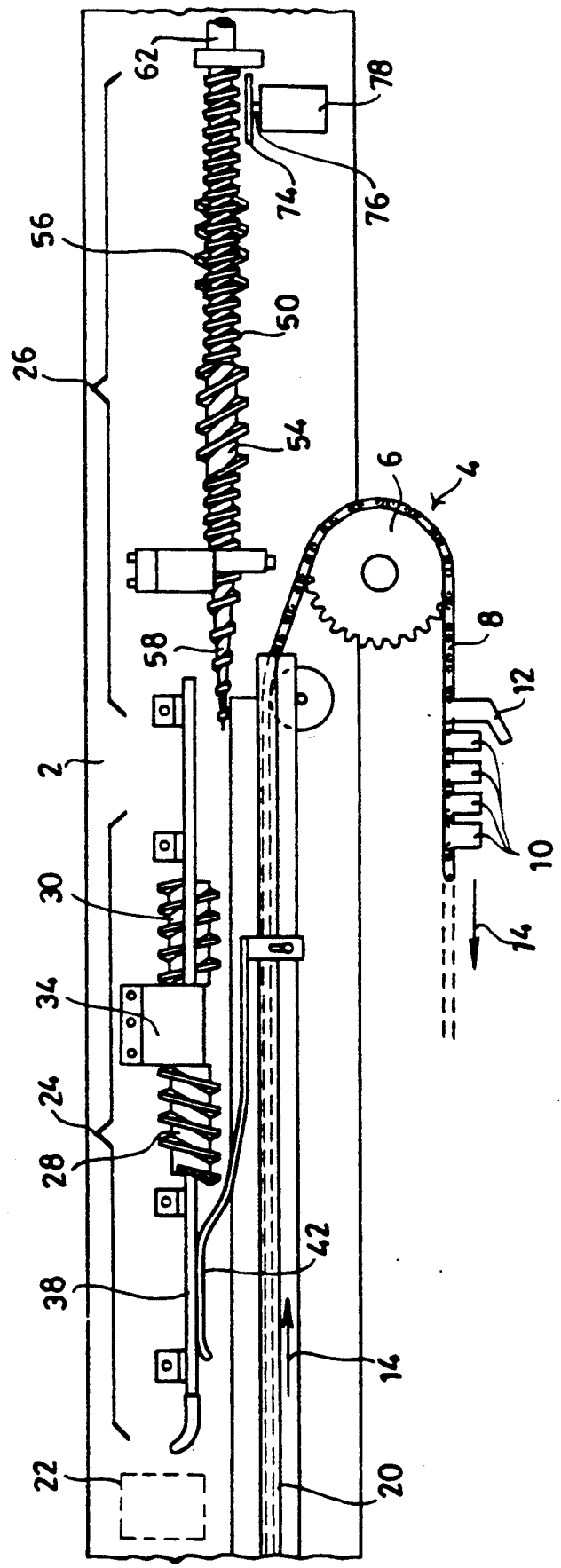
FIG. 1 shows a side view of a device according to the invention.
Figure 2:
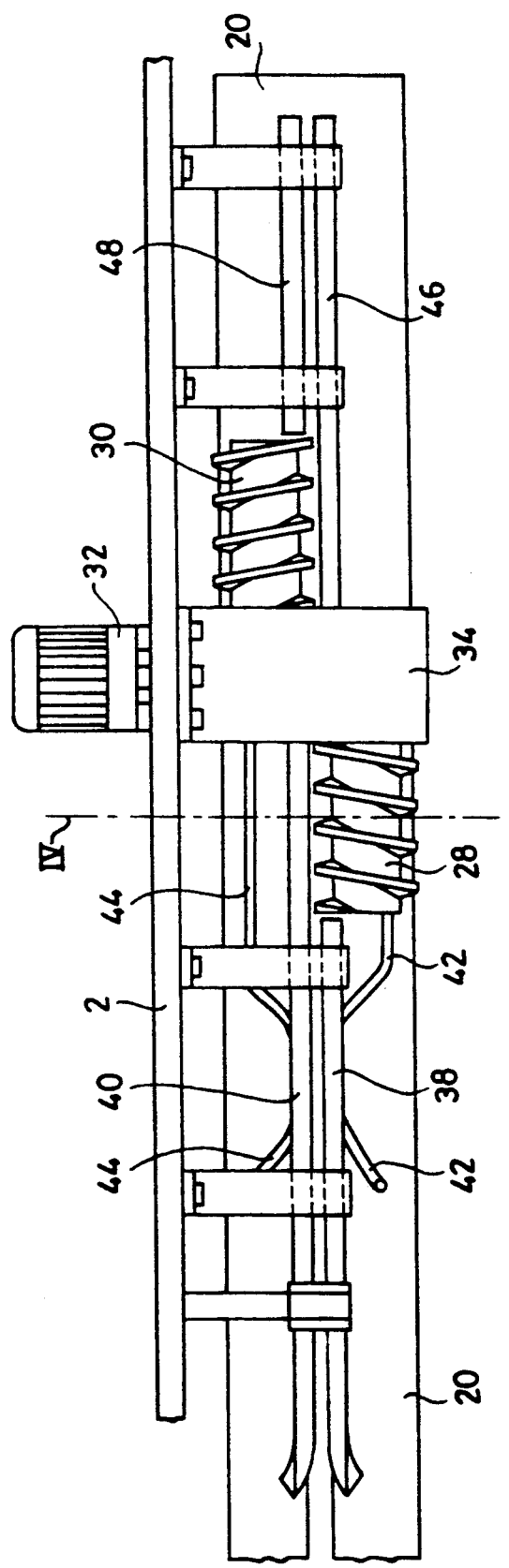
FIG. 2 shows a top view of a second processing station of the device of FIG. 1.
Figure 3:
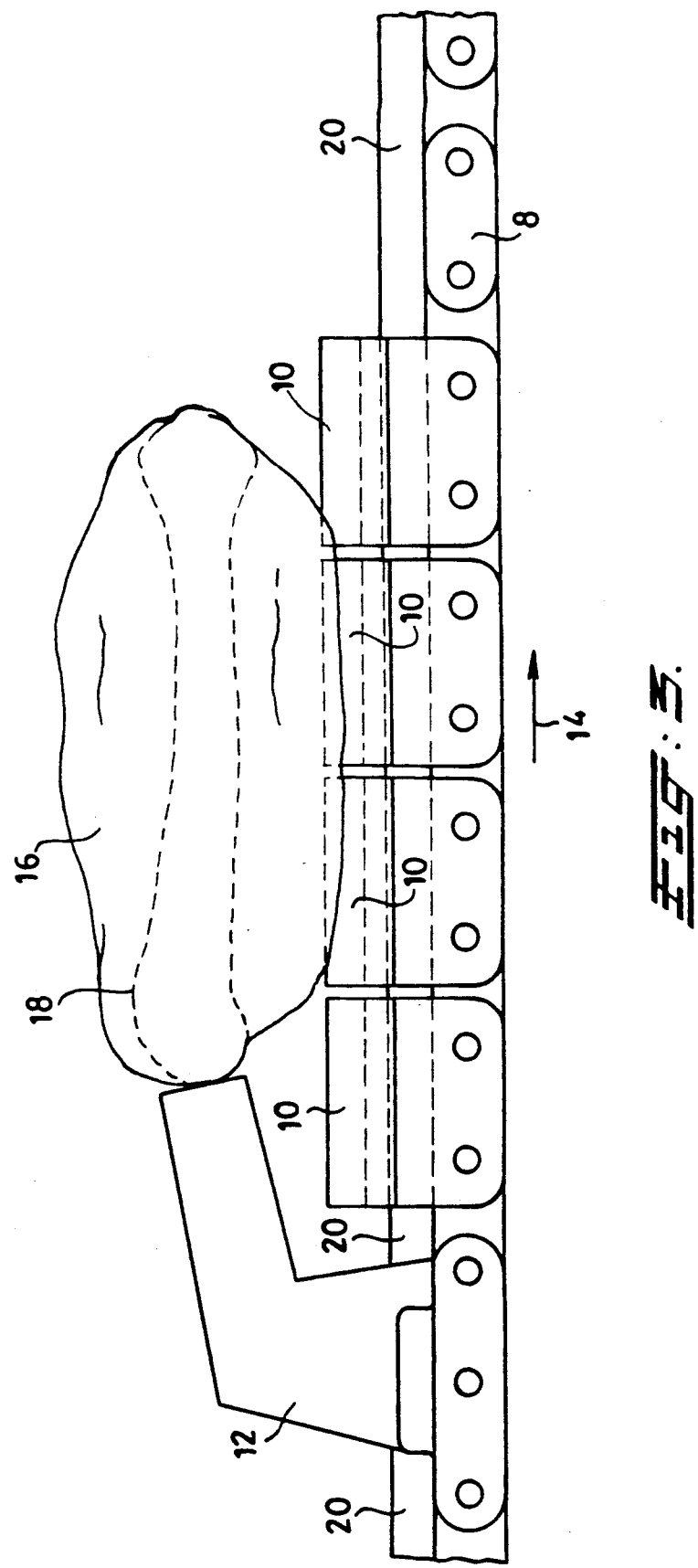
FIG. 3 shows a part of a first conveyor with carriers of the device of FIG. 1.
Figure 4:
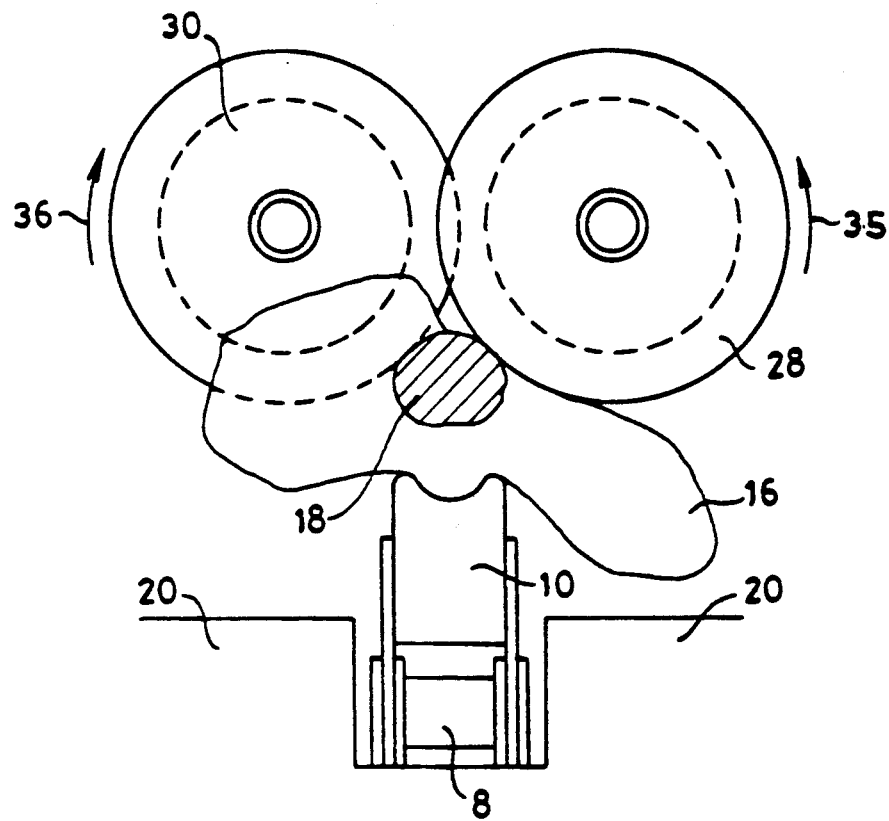
FIG. 4 shows a schematic cross-section, viewed in the direction of conveyance, of a piece of meat situated in the second processing station at the line IV in FIG. 2.

FIG. 1 shows a fixing element 2, to which the various parts of the device, including a first conveyor 4, are fixed by means of supporting elements, which may if necessary be provided with suitable bearings. This conveyor has a number of gear wheels 6, over which an endless chain 8 is stretched, which chain is provided in some places with carriers 10 and a supporting pin 12. In operation, the chain 8 is move by driving one of the gear wheels 6 in the direction indicated by an arrow 14, and the carriers and the supporting pin thereby move alternately along the bottom part of the chain track and along the top part thereof. At the beginning of the top part of the chain track (see FIG. 3) a piece of meat 16 containing an elongated bone 18 is placed on the carriers 10. The piece of meat is positioned in such a way that the bone is aligned in the direction of movement 14 of the chain 8, and the piece of meat 16 is supported at the rear side by the supporting pin 12. In order to prevent the meat from coming into contact with the links of the chain 8 and the lubricants thereon, the top side of the chain runs in a groove of a plate 20.

In operation, the first conveyor 4 takes the piece of meat 16 in succession through a first processing station 22, a second processing station 24, and a third processing station 26.

In the first processing station 22, a separation can be made along the length of the bone through the meat up to the bone, for example by means of a rotary knife cutting in the vertical direction.

The layout of the second processing station 24 and the way in which it works will be described with reference to FIGS. 1 to 4. Disposed above the path of the piece of meat 16 on the first conveyor 4 are two first helical rollers 28 and 30 which are provided with ribs of opposite pitch and rotate in opposite directions to each other. These helical rollers are placed after one another parallel to and on either side of the path of the bone, and are driven by means of a motor 32 via a gearbox extension 34. The helical rollers 28 and 30 rotate in the directions indicated by arrows 35 and 36 respectively in FIG. 4, in the method of which they touch the bone while it is passing, near a separation which is present. In the case of the direction of rotation and pitch of the helical rollers shown the helical roller rib moves in the opposite direction to that of the direction of conveyance 14, and the helical rollers 28 and 30 have a downward scraping action on the connection between the bone 18 and the meat 16, which action is directed in the two peripheral directions.

It should be pointed out that the above-mentioned movement of the helical roller rib in the opposite direction to that of the direction of conveyance is not essential for good functioning of the device according to the invention. The only important factor is a difference between the speed of the conveyor and that of the helical roller rib, whereas the direction of movement of the two elements can be either identical or opposite.

Placing the helical rollers 28 and 30 after one another means that even in the case of relatively great variations as regards shape and dimensions of the bone to be removed a correct scraping action is obtained, in particular because a helical roller and a bone can maintain constant contact during passing, because the bone is not strongly fixed on the carriers, or is otherwise prevented from selecting a particular position.

Various guides 40, 42, 44, 46 and 48 are fitted above the path followed by the piece of meat 16 on the first conveyor 4, for guiding the meat downwards, so that on the one hand, the meat ends up under the helical rollers 28 and 30 and, on the other, the bone is held above the carriers 10.

Figure 5:
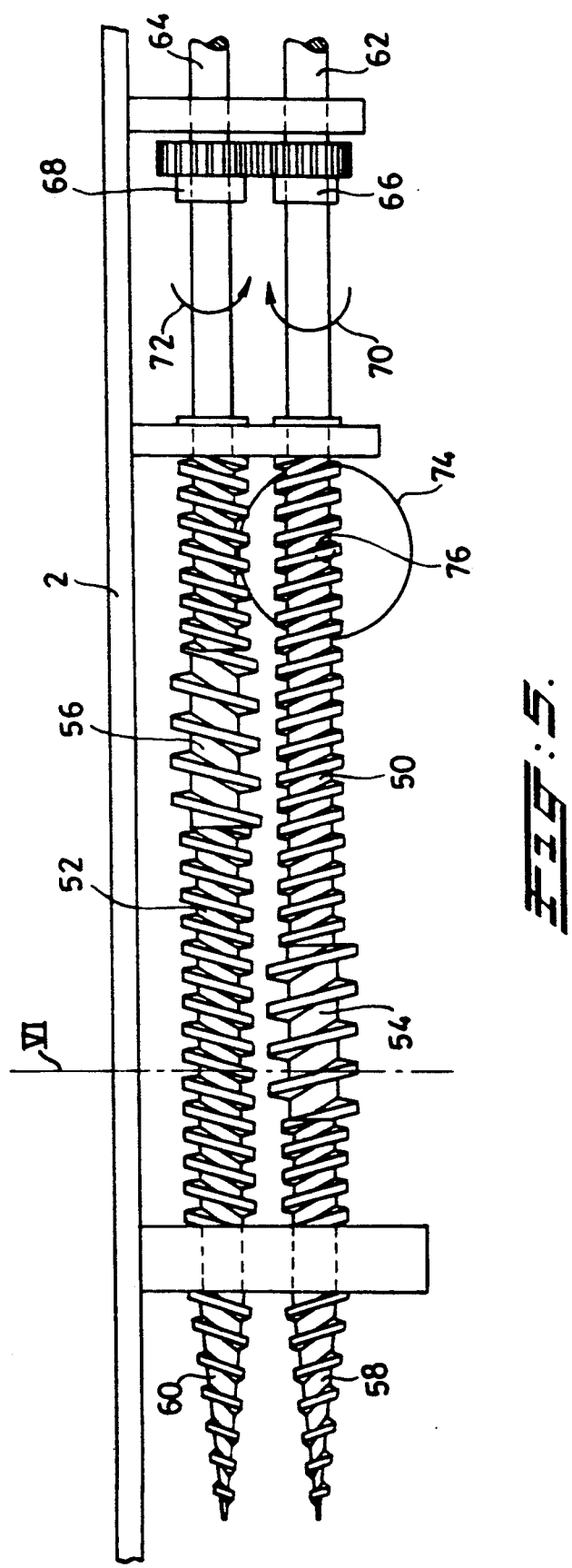
FIG. 5 shows a top view of a third processing station of the device of FIG. 1.

The layout of the third processing station 26 and the way in which it works will be described with reference to FIGS. 1, 5 and 6. The piece of meat, partially scraped away from the bone 18 in the second processing station 24, is transferred by means of the first conveyor 4 from the carriers 10 to a worm conveyor comprising two elongated helical rollers 50 and 52 which are disposed next to each other and are provided with ribs of opposite pitch, and which rotate in opposite directions to each other. The helical rollers 50 and 52 contain helical rollers 54 and 56 with a larger pitch and a larger diameter, disposed one after the other. The opening between the helical rollers 50 and 52 is such that a bone cannot pass through it.

Figure 6:
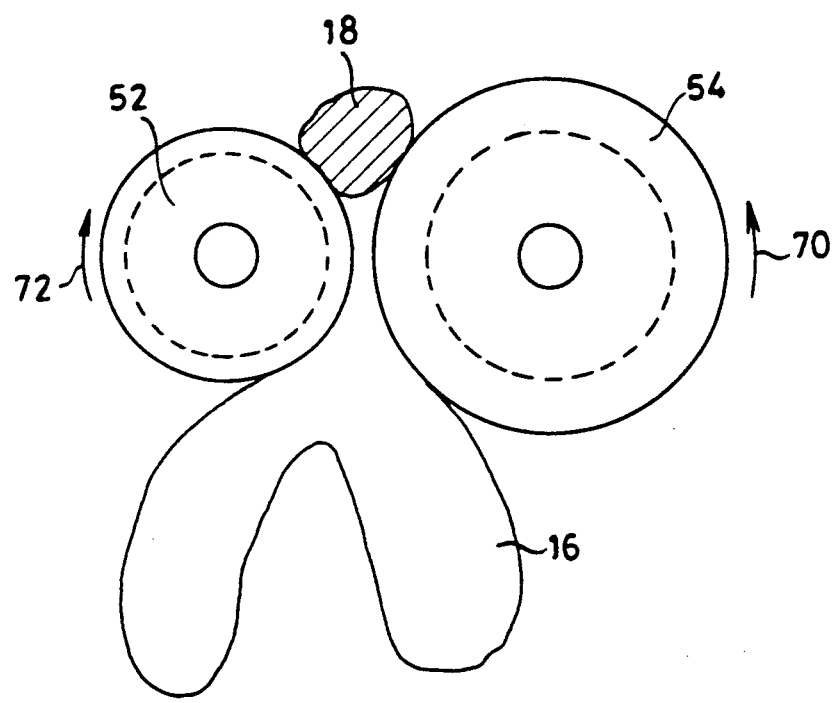
FIG 6 shows a schematic cross-section, viewed in the direction of conveyance, of a piece of meat situated in the third processing station at the line VI in FIG. 5.

The two helical rollers 50 and 52 are provided at the beginning thereof with conical parts 58 and 60 which, as a result of their vertical position, ensure that the bone from a piece of meat fed in by the conveyor 4 ends up at the top side of the helical rollers 50 and 52 and the meat ends up at the bottom side, all this as illustrated in FIG. 6. Otherwise, it is not necessary to provide both conical parts 58 and 60 of the helical rollers 50 and 52 with a helical rib; only one of the two parts need be designed as a conical helical roller. Instead of in the manner described, the transfer of a piece of meat from the second processing station 24 to the third processing station 26 can also take place by means of conveyors not described in detail, in which case the conical parts 58 and 60 of the helical rollers 50 and 52 can be omitted.

The engaged gear wheels 66 and 68 ensure that when one of the two shafts 62 and 64 is driven the helical rollers 50, 54 and 58 turn in a direction 70 opposite to the direction 72 of the helical rollers 52, 56 and 60, so that the bone 18 and the piece of meat 16 are moved along by the worm conveyor in the direction away from the second processing station.

The helical rollers 54 and 56 have the same function as the helical rollers 28 and 30 in the second processing station 24: they scrape the meat 16 off the bone 18 in the two peripheral directions of the bone.

For a certain flexibility as regards the shape and dimensions of a bone to be removed, the scraping helical rollers 28, 30, 54 and 56 have ribs of elastic material or ribs containing resilient scraper elements.

After passing the third processing station only a narrow connection between the bone and the piece of meat remains. This connection is broken by conveying the meat via a rotary knife 74 which is disposed below the path of the bone and is driven via a shaft 76 by a motor 78.

What is claimed is:

1. A device for removing an elongated bone from a piece of meat, in particular for removing the thigh bone from a piece of poultry thigh meat, comprising:
   conveyor means for conveying the piece of meat along a path in a forward direction with the bone generally aligned with the forward direction;
   a first processing station comprising a cutting device positioned along the path of the bone for forming a separation in the meat along the length of the bone through the meat up to the bone;

a second processing station comprising at least one pair of helical rollers disposed parallel to and on opposite sides of the path of the bone, said helical rollers being adapted for touching the bone in operation for scraping the meat away from the bone generally perpendicular to the lengthwise direction of the bone, until a part of the bone surface is exposed, apart from a narrow connection between the meat and the bone, the pitch of said helical rollers being such that the apparent axial speed of movement of the helical roller ribs by rotation of the helical rollers differs from the speed of movement of the conveyer means; and a final processing station comprising a cutting device disposed along the path of the bone for severing the narrow connection.

2. A device according to claim 1, wherein the second processing station comprises at least two pairs of helical rollers.

3. A device according to claim 1, wherein each pair of helical rollers is provided with ribs with opposite pitch and wherein individual rollers in each pair rotate in opposite directions to each other.

4. A device according to claim 1, wherein the apparent direction of axial movement of the helical roller ribs on rotation of a pair of helical rollers is opposite to the direction of movement of the conveyor means.

5. A device according to claim 1 wherein the direction of rotation of the helical rollers is such that a surface of the ribs thereof moves over the bone in the direction of the conveyor means.

6. A device according to claim 1 wherein said pair of helical rollers are placed after one another, viewed in the direction of conveyance of said conveyor means.

7. A device according to claim 1, said second processing station comprising a second conveyor means with carriers, to which the piece of meat is transferred from said first conveyor means, the bone ending up at the top side of the carrier, and the meat at the bottom side thereof, which second conveyor means comprises a second pair of helical rollers provided with ribs with opposite pitch and rotating in opposite directions to each other, said second pair of helical rollers being disposed parallel to and on opposite sides of the path of the bone and touch the bone in operation, the pitch of said second pair of helical rollers being such that the apparent speed of movement of the helical roller ribs during rotation of the helical rollers differs from the speed of movement of the second conveyor, and the direction of rotation of the second pair of helical rollers being such that a surface of the ribs thereof moves over the bone in the direction of the carriers.

8. A device according to claim 7, wherein the second conveyor means is in the form of a worm conveyor comprising an elongated third pair of helical rollers disposed next to each other and provided with ribs with opposite pitch, and rotating in opposite directions to each other, said third pair of helical rollers being disposed parallel to each other and on opposite sides of the path of the bone, and in that the second pair of helical rollers form part of the worm conveyor, while each roller of the second pair of helical rollers has a greater diameter than each roller of the third pair of helical rollers.

9. A device according to claim 8, wherein at least one of the rollers of the third pair of helical rollers is provided at the beginning thereof with a conical fourth helical roller with a rib and a direction of rotation corresponding to the third helical roller in line with which it is situated, while the point of the fourth helical roller is directed opposite to the direction of conveyance of the meat and is disposed in such a way that the bone ends up at the top side of the worm conveyor and the meat ends up at the bottom side thereof.

10. A device according to claim 8, wherein the pitch of the second helical rollers is greater than that of the third pair of helical rollers.

11. A device according to claim 7, wherein the rib of the first or the second pair of helical rollers can be deformed by the forces exerted thereon by the bone.

12. A device according to claim 1, wherein the above-mentioned narrow connection is broken by means of a knife disposed directly below the path of the bone.

* * * * *

UNITED STATES PATENT AND TRADEMARK OFFICE
CERTIFICATE OF CORRECTION

PATENT NO. : 5,104,351

DATED : April 14 1992

INVENTOR(S) : Adrianus J. van den Nieuwelaar and Henricus F. J. M. van de Eerden It is certified that error appears in the above-indentified patent and that said Letters Patent is hereby corrected as shown below:

On the title page, "12 Claims, 6 Drawing Sheets" should read --17 Claims, 6 Drawing Sheets--.

Column 6, line 43 please add the following new claims:

13. A device for removing an elongated bone from a piece of meat, in particular for removing the thigh bone from a piece of poultry thigh meat, comprising:
conveyor means for conveying the piece of meat along a path in a forward direction with the bone generally aligned with the forward direction;
a first processing station positioned along the path of the bone for forming a separation in the meat along the length of the bone through the meat up to the bone;
a second processing station comprising at least one pair of helical rollers disposed parallel to and on opposite sides of the path of the bone, said helical rollers being adapted for touching the bone in operation for scraping the meat away from the bone generally perpendicular to the lengthwise direction of the bone, until a part of the bone surface is exposed, except for a narrow connection between the meat and the bone, the pitch of said helical rollers being such that the apparent axial speed of movement of the helical roller ribs by rotation of the helical rollers differs from the speed of movement of the conveyor means; and
a final processing station comprising a cutting device disposed along the path of the bone for severing the narrow connection.

14. A device according to Claim 13 wherein the second processing station comprises at least two pairs of helical rollers.

UNITED STATES PATENT AND TRADEMARK OFFICE
CERTIFICATE OF CORRECTION

PATENT NO. : 5,104,351

DATED : April 14, 1995

INVENTOR(S) : Adrianus J. van den Nieuwelaar and Henricus F. J. M. van de Eerden It is certified that error appears in the above-indentified patent and that said Letters Patent is hereby corrected as shown below:

15. A device according to Claim 13 wherein each pair of helical rollers is provided with ribs with opposite pitch and wherein individual rollers in each pair rotate in opposite directions to each other.

16. A device according to Claim 13 wherein the apparent direction of axial movement of the helical roller ribs on rotation of a pair of helical rollers is opposite to the direction of movement of the conveyor means.

17. A device according to Claim 13 wherein said first processing station comprises a cutting device.

Signed and Sealed this

Fourteenth Day of November, 1995

*Attest:*

BRUCE LEHMAN

*Attesting Officer*    *Commissioner of Patents and Trademarks*